United States Patent
Smith et al.

(10) Patent No.: US 6,905,259 B2
(45) Date of Patent: Jun. 14, 2005

(54) TILT-IN-PLACE ALIGNMENT SYSTEM AND METHOD

(75) Inventors: Steven E. Smith, Coppell, TX (US); Donald A. Powell, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 302 days.

(21) Appl. No.: 10/035,903

(22) Filed: Dec. 31, 2001

(65) Prior Publication Data

US 2003/0123808 A1 Jul. 3, 2003

(51) Int. Cl.$^7$ ................................................. G02B 6/36
(52) U.S. Cl. ............................ 385/90; 403/143; 385/52
(58) Field of Search ........................... 385/52, 136, 137, 385/138, 25, 80, 81, 90, 91; 439/8; 403/122, 143, 144, 149, 141, 90; 362/421; 248/181.1

(56) References Cited

U.S. PATENT DOCUMENTS

| | | | | |
|---|---|---|---|---|
| 718,445 A | * | 1/1903 | Fliehmann | 248/181.1 |
| 916,286 A | * | 3/1909 | Evans | 248/181.1 |
| 1,549,163 A | * | 8/1925 | Swanson | 362/421 |
| 3,870,986 A | * | 3/1975 | Oka et al. | 338/128 |
| 4,607,976 A | * | 8/1986 | Peek et al. | 403/77 |
| 5,095,517 A | | 3/1992 | Monguzzi et al. | |
| 5,604,361 A | * | 2/1997 | Isaksson | 257/99 |
| 5,937,123 A | | 8/1999 | Frelier | |
| 6,152,640 A | * | 11/2000 | Oda et al. | 403/133 |
| 6,202,968 B1 | | 3/2001 | Lehr | |
| 6,343,889 B1 | * | 2/2002 | Hendricks et al. | 403/143 |
| 6,476,986 B2 | * | 11/2002 | Smith et al. | 359/827 |
| 6,490,868 B1 | * | 12/2002 | Bunce et al. | 60/803 |

OTHER PUBLICATIONS

U.S. Non-provisional Appl. No. 09/745,860, filed Dec. 28, 2000, entitled "Six-Axis Attachment Apparatus and Method for Spatial Light Modulators".

* cited by examiner

Primary Examiner—Neil Abrams
(74) Attorney, Agent, or Firm—Charles A. Brill; Wade James Brady, III; Frederick J. Telecky, Jr.

(57) ABSTRACT

Disclosed is a mounting system and method in which symmetrical springs are used about a collar in a gimbal system to capture an assembly of a ball and an optical or other type of component. Once captured within the mounting system, the ball/component assembly can pivot until an optimal alignment is reached. Once the optimal alignment is reached, the ball/component assembly is fixed using laser welding.

26 Claims, 3 Drawing Sheets

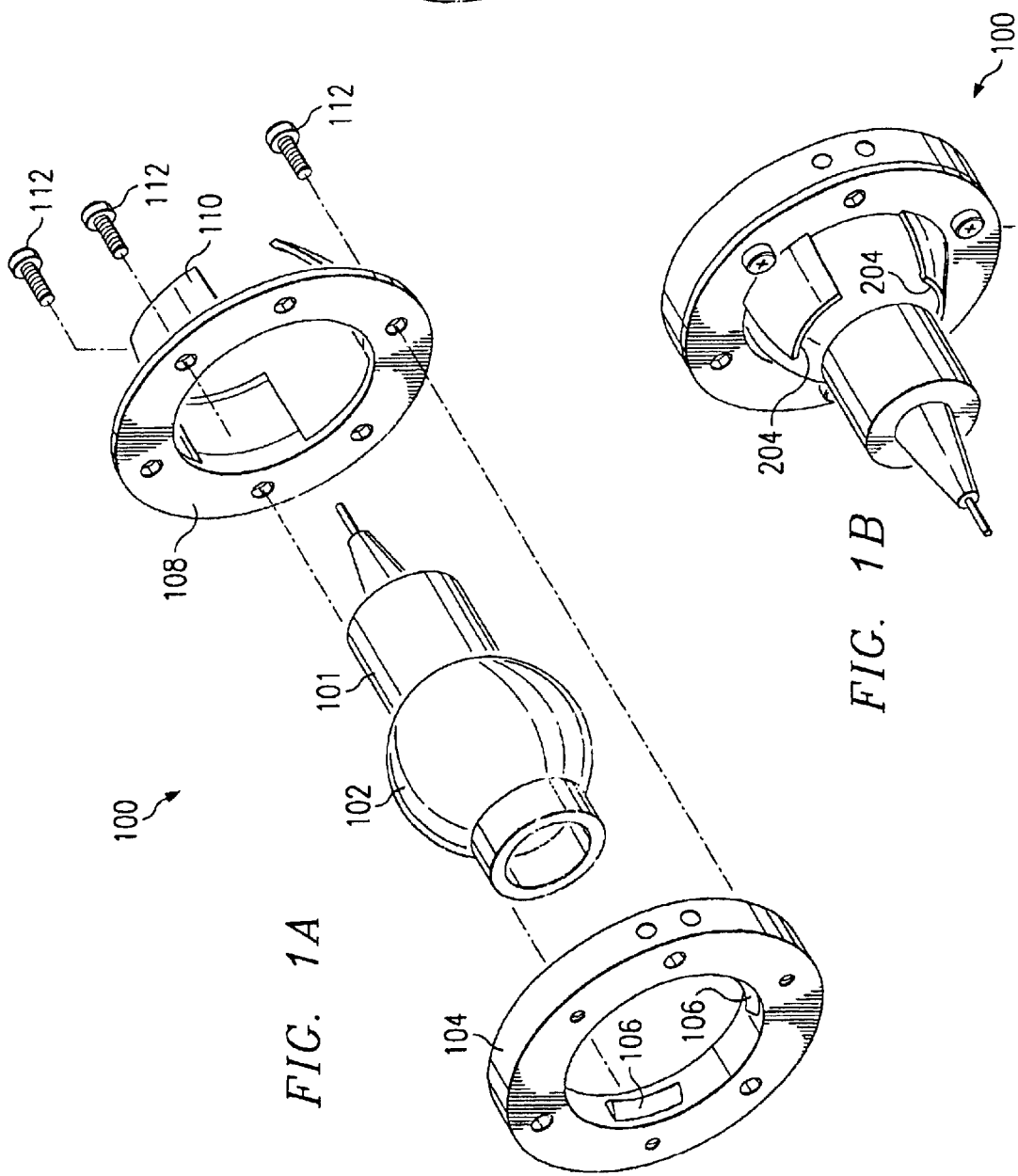

TILT-IN-PLACE ALIGNMENT SYSTEM AND METHOD

TECHNICAL FIELD

Connectors and connector-mounting systems for joining optical fibers to optical equipment. More generally, a system for establishing angular alignment of components.

BACKGROUND

It is important for optical components to be properly aligned, one to another, and particularly for them to have proper angular alignment. For example, in an optical telecommunications system, optical fibers are coupled to optical equipment in the system such as optical repeaters, equalizers, attenuators, add/drop multiplexers, and other transmission equipment. The optical fibers are typically aligned to the optical equipment whereby the "insertion loss," which is the loss that occurs from the connection of the elements, one to another, is minimized. Lenses, mirrors, and Spatial Light Modulators ("SLMs") are also typically angularly aligned within their respective component assemblies. In some cases, these such components are angled into position and locked down with epoxy, solder, and/or spring mechanisms.

A difficulty with typical alignment and attachment methods are that once aligned, the alignment is often not stably maintained over the changing environments to which the equipment and/or component assemblies are exposed. Angle instability directly correlates to insertion loss and signal degradation in an optical system. Such loss and degradation decreases optical network performance and may require the addition to the network of compensating equipment.

Additionally, known mounting systems are often not symmetrical about the component to be mounted, and thus the process of tightening and affixing of the optical component to the system tends to further create angular misalignment that must be iteratively compensated for.

SUMMARY

Described below is a mounting system and method which provides for angular lock-down of components, and specifically optical components. Described embodiments employ a gimbal mechanism having opposing collars (i.e., a collar attached to a socket) into which a ball is captured. The component to be aligned is permanently or semi-permanently affixed to the ball, which in turn is captured within the opposing collars, or within a mated collar/socket set, of the gimbal. The rotational movement of the ball within the gimbal mechanism provides for the angular alignment of the component captured within the ball. Thus, the ball/component assembly is rotated until proper alignment is reached, whereupon the spring fins on one collar of the gimbal mechanism are welded to the ball. The laser weld on the spring fins at symmetric locations about the circumference of the ball portion of the gimbal locks in the tilt of the component with metal-to-metal bonding.

Challenges posed by prior-art solder and/or epoxy mounting schemes include the high thermal expansion rate posed by those mounting schemes/materials. This high thermal expansion rate makes the alignment unstable when the mounting is exposed to temperature variations. Solder and epoxy are also cumbersome in that they are additional materials which can sometimes "gunk" up the assembled equipment and/or manufacturing equipment. Further, such materials require cure times and must be processed at or near room temperature. The solder and/or epoxy can also be somewhat unreliable mounts when exposed to vibration.

Welded joints, on the other hand, are robust when exposed to vibration. Welded joints between the same materials are also rugged when exposed to changing environments, because such connections do not rely on materials with high thermal expansion rates. Laser welding, as a technique for forming connection between metallic components, can be performed over a wide range of temperatures. Laser welding is also quick and relatively clean, and further adapts well to the automated manufacturing processes.

The described embodiments further provide for mounting points about the circumference of the component to be mounted, whereby once the collar and socket are connected, the ball/component assembly are relatively fixed translationally, while the assembly is free to move pivotally whereby the angular alignment of the component can be effected.

BRIEF DESCRIPTION OF THE DRAWINGS

FIGS. 1A–1C are exploded and assembly perspective views of an embodiment of a tilt-in-place component mounting assembly;

Figure 2A:
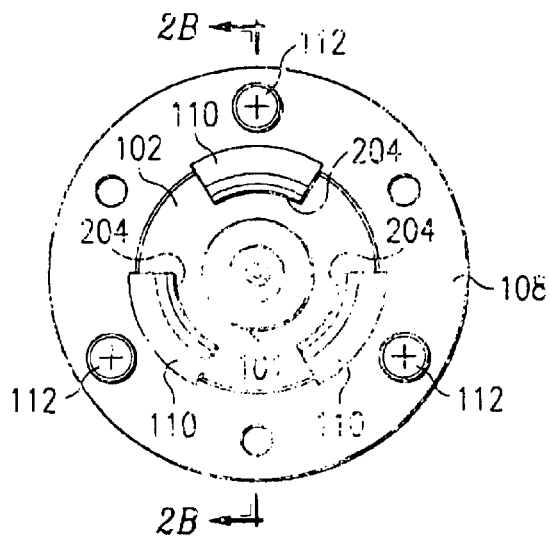
FIGS. 2A–2C are rear and cross-sectional views of an embodiment of a tilt-in-place component mounting assembly.

All of these drawings are drawings of certain embodiments. The scope of the claims are not to be limited to the specific embodiments illustrated in the drawing and described below.

DESCRIPTION OF THE EMBODIMENTS

FIG. 1A is an exploded perspective view of a mounting system that provides angular lock-down of components. In this example, the component 101 is a collimator, and it is attached to a steel ball 102. The attachment of the component 101 to the ball 102 is a permanent or semi-permanent one, and may be effected using fasteners, adhesive, friction, or types of mounting devices or methods. The collimator 101 used in this example is a type of optical component, which in this instance is used to couple light beams traveling over optical fibers to and from other optical components. The use of a collimator 101 is exemplary, and many other types of components could be mounted in this system to provide angular lock-down and angular alignment with other components. As shown in the figure, the ball 102 mates with a socket 104, preferably interfering with the socket 104 at raised features 106.

The socket 104 is generally ring-shaped wherein its inner circumference is generally smaller than the circumference of the ball 102 to which it is mated. The inner circumference of the socket 104 could also be larger than the ball 102 if the raised features 106 give an effective inner circumference that is smaller than the circumference of the ball 102. The raised surfaces may be provided by bearings 106 mounted into the socket 104, and they preferably allow the ball 102 to pivot freely within the socket 104 while the assembly is being mounted, and may be arranged symmetrically about the inner ring of the socket 104. In the embodiment shown in FIG. 1, there are three bearings 106 located at equal distances from each other about the inner ring. Bearings 106 are preferably made of Teflon (a product of E.I. du Pont de Nemours and Company known generically as tetrafluoroethylene) or other low coefficient of friction, plastic-type material which will not seize when in contact with the ball 102. Alternatively, the bearings 106 could be brass or another material whose surface will not tightly couple to the surface of the ball 102. The bearings 106, could alternatively be raised surfaces on the inner circumference of the socket 104, instead of bearings. In that instance, the socket 104 would be made of a material that would not seize or bind with the ball 102. Alternatively, the raised features 106 of the socket 104 could be coated with a material that would not bind with the ball 102.

Behind the ball 102 is placed a collar 108, which is provided to mount to the socket 104. The collar 108 has a circular opening which receives the ball 102, and has fins or springs 110 which contact under pressure with the ball 102 as the collar is brought into mating contact with the socket 104. In this way, the fins or springs 110, which may be positioned in a generally symmetrical fashion about the circular opening in the collar 108, will be under tension when the socket 104 is engaged with the collar 108. Engagement of the fins 110 to the ball in this embodiment may be facilitated by placing the bearings on the socket 104 approximately opposite to the fins 110 on the collar 108.

Fasteners 112 are provided to permanently or semipermanently mate the collar 108 to the socket 104. These fasteners 112 may be screws, rivets, welds, or other fastening devices. Even after the collar and socket are permanently attached to each other, the ball and collimator assembly 102, 101 are still free to pivotally move within the assembly until the ball and collimator assembly 102, 101 is welded to the collar 108 and/or socket 104. Absent other rotational forces being placed on the ball/collimator assembly, the springs 110 on the collar 108 would be under tension and accordingly would keep the ball/collimator assembly relatively fixed within the entire assembly.

When the ball/collimator assembly 102, 101 is in its desired alignment, the springs 110 of the collar 108 are laser-welded to the ball 102. In one embodiment, both the springs 110 and the ball 102 are made of steel. The laser- or ultrasonic-weld melts the materials where they meet, and when the materials re-cool, they are physically joined by the mixing of the melted materials at the contact points. FIGS. 1B–1C show the completed assembly complete with weld spots 204 (see also FIG. 2C) as they would be after assembly.

The embodiments illustrated in FIGS. 1A–C show three springs 110 spaced symmetrically about the circumference of the collar 108. Configurations having more or fewer springs are also possible. Specifically, the configuration shown could be extended to systems having three or more springs by spacing the three or more springs about the inner perimeter of the collar 108, typically in an arrangement having an equal separation between each spring 110 and its next-door neighbors. Other symmetric or non-symmetric arrangements are also possible. The fasteners 112 would also typically have a symmetric arrangement about the collar 108, and may also have a certain relationship to the springs 110. For instance, a fastener 112 could be placed directly behind each spring 110 on the collar 108, or on either side of each spring 110 on the collar 108. To ensure a firm contact between the ball 102 and the springs 110, it may also be advantageous for the bearings 106 to have a placement that corresponds to the springs 110. This correspondence of bearing 106 to spring 110 might be one-to-one or two-to-one or one-to-two, but in any instance a regular placement of the bearings 106 to the springs 110 may promote effective welding of the solder points 204.

FIG. 2A is a front view of the mounting system with a collimator 101 mounted therein. This view shows the regular placement of the springs 110 about the perimeter of the collar 108 and the correspondence between the springs 110 and the fasteners 112. In the embodiment shown here, there is a one-to-one correspondence between the springs 110 and the fasteners 112, and specifically behind each spring 110 is a fastener 112. As previously mentioned, and as also shown in FIG. 2B, below, there may also be established a correspondence between the springs 110 and the bearings 106.

Figure 2B:
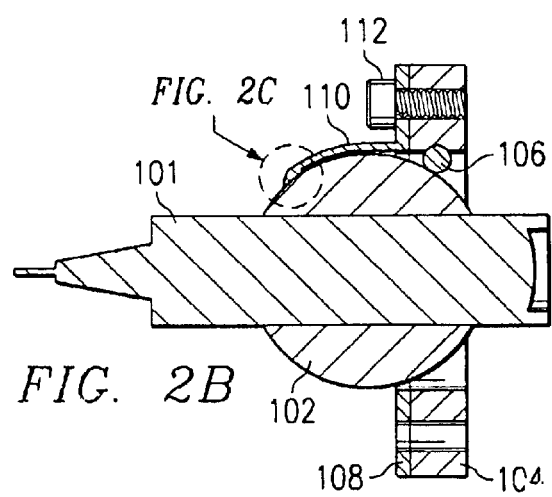

FIG. 2B is a cross-sectional view of the mounting system and collimator of FIG. 1A. The cross-section shows the intimate connection between the collimator 101 and the ball 102, whereby the ball/collimator assembly move as a single unit within the mounting system before it is locked down through the welding process. The spring 110 is mechanically biased against the ball 102, holding it against the bearings or raised surfaces 106 of the socket 104. Fastener 112 is shown in this figure joining the collar 108 to the socket 104. After the collar 108 is joined to the socket 104, but before the springs 110 are welded to the ball 102, the ball/collimator assembly 102/101 is free to rotate within the mounting system.

Figure 2C:
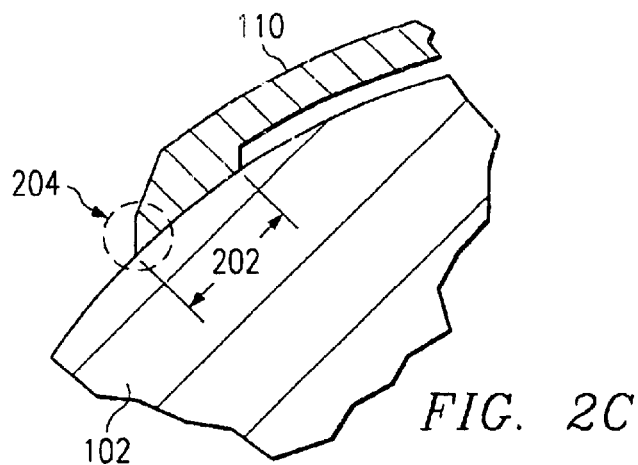

FIG. 2C shows an exemplary cross-section of a spring 110 in contact with the ball 102. As can be seen in this cross-section, the spring 110 is designed with a small contact point of approximately 1 mm 202. Depending upon the actual contact point between the spring 110 and the ball 102, the actual weld point may be a smaller area such as designated by area 204. Given the thinness of the springs 110, they can deflect and thereby hold the ball/collimator assembly 102/101 relatively in place under tension.

Figure 3:
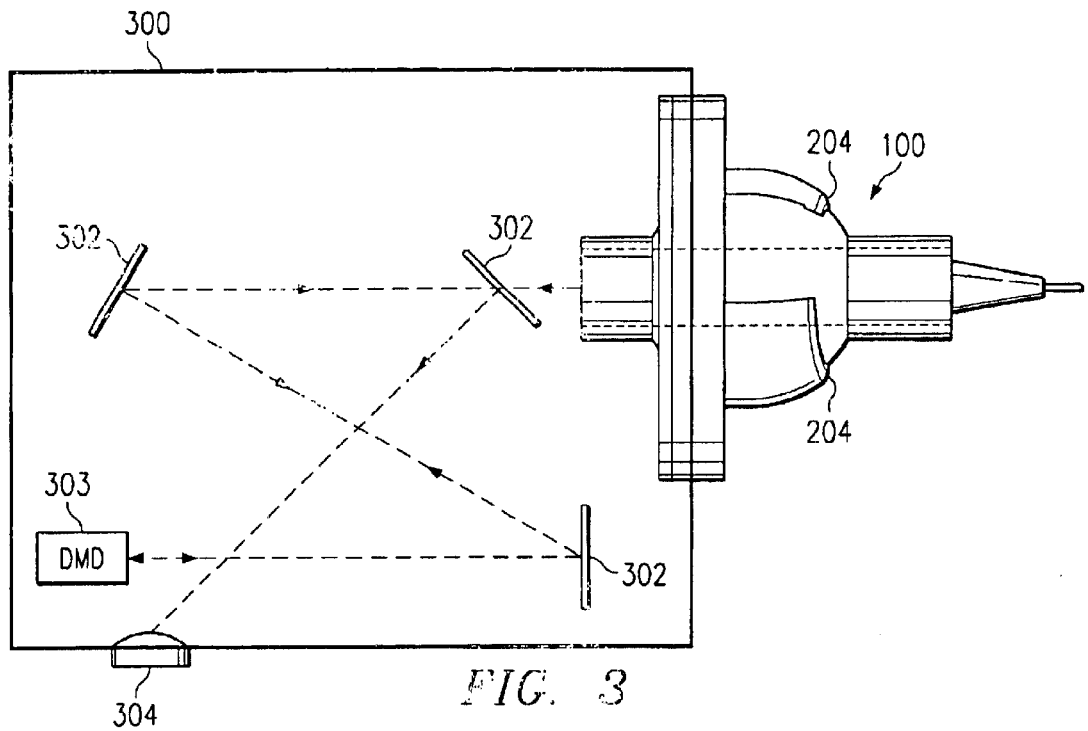
FIG. 3 illustrates an exemplary optical system in which a tilt-in-place component mounting assembly can be used.

FIG. 3 represents the way the described embodiments could be implemented actual system. This figure shows a piece of optical equipment 300 into which an assembly 100 is mounted. The assembly is mounted with the welds 204 not being formed, and test equipment is placed at the output 304 of the piece of optical equipment 300. Optical test equipment at the output 304 can be used to measure optical signal intensity. The angular alignment of the ball/component assembly 102/101 is adjusted seeking a point of minimal insertion loss and therefore representing the best case-case alignment of the collimator 101 to the optical equipment 300.

Figure 4:
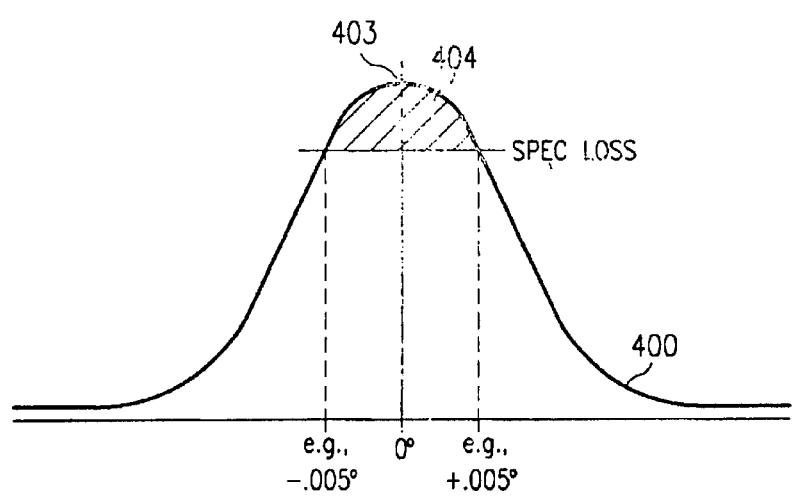
FIG. 4 is a diagram illustrating the principle of the loss of optical energy in a misaligned optical connection.

FIG. 4 is a graph 400 of an optical signal transmitted through two components optically coupled using the tilt-in-place component mounting system. The peak of the graph represents the optimal alignment 403 and the graph tails off as the angular alignment deviates in any direction from the optimal alignment. Once the optimal alignment point is reached, this would be the point at which the laser weld would be performed on the springs 110 of the assembly 100 to lock the alignment of the collimator 101 into place with the optical equipment 300. In a practical implementation, this welding would occur when the alignment is within a specified band, e.g., when the transmissivity is "within spec," which is indicated by the shaded area 404.

The system is well-suited to optical applications, because such applications typically have critical alignment needs. For example, instead of a collimator, the optical equipment to be aligned could be a laser, a lens, a mirror, a Spatial Light Modulator ("SLM"), such as a Digital Micromirror Device ("DMD"), or a number of other optical devices. For these optical applications, it is often important that the angular alignment of the components be carefully set. The systems described here could also be used in other types of optical devices such as microscopy and telescopy. Additionally, this process of angular alignment could be used outside the field of optics, such as for aligning various mechanical devices, acoustic devices or in other applications where angular alignment can be critical.

The method of attaching the springs to the ball is laser welding in embodiments described above. Traditional welding, sonic welding, or other types of welding can be used to effect this connection. Additionally, fasteners, adhesives, or other connection systems can be used to lock down the connections between the springs and the ball when the ball/component assembly have been optimally aligned or aligned to a desired degree.

A few preferred embodiments have been described in detail hereinabove. It is to be understood that the scope of the invention also comprehends embodiments different from those described, yet within the scope of the claims. Words of inclusion are to be interpreted as nonexhaustive in considering the scope of the invention. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A component mounting system comprising:
   a) a ball to be fixed to a component to be aligned, the ball and component together forming a ball-and-component assembly;
   b) a socket into which the ball is placed; and
   c) a collar to be mounted to the socket, whereby the socket and collar capture the ball between them, the collar having springs welded to the ball.

2. The component mounting system of claim 1 wherein the socket comprises raised features about the socket's interior.

3. The component mounting system of claim 2 wherein the raised features are ball bearings mounted into the socket.

4. The component mounting system of claim 2 wherein the raised features are raised surfaces of the socket.

5. The component mounting system of claim 2 wherein the raised features are symmetrically located about the socket.

6. The component mounting system of claim 5 wherein the raised features are stainless steel.

7. The component mounting system of claim 5 wherein the raised features are brass.

8. The component mounting system of claim 5 wherein the raised features are tetrafluoroethylene.

9. The component mounting system of claim 1 wherein the component to be mounted is an optical component.

10. The component mounting system of claim 1 wherein the socket has a circular opening into which the ball-and-component assembly is placed.

11. The component mounting system of claim 1 wherein the socket, collar, and ball are formed of the same material.

12. The component mounting system of claim 1 wherein the socket, collar, and ball are formed of stainless steel.

13. The component mounting system of claim 1 wherein the component to be mounted is selected from the group consisting of collimators, lasers, lenses, and spatial light modulators.

14. The component mounting system of claim 1 wherein the springs are shaped like fins which protrude from the collar.

15. A component mounting system comprising:
   a) a ball to be fixed to a component to be aligned, the ball and component together forming a ball-and-component assembly;
   b) a socket into which the ball may be placed, the socket comprising ball bearings about the socket's interior in contact with the ball; and
   c) a collar to be mounted to the socket, the collar also having an opening therein, whereby the socket and collar capture the ball, the collar also having springs that are located about the opening wherein the springs are adapted to make contact with the ball.

16. The component mounting system of claim 15 wherein the springs are shaped like fins which protrude from the collar.

17. The component mounting system of claim 15 wherein the springs are welded to the ball.

18. The component mounting system of claim 15 wherein the socket comprises stainless steel raised features in contact with the ball.

19. The component mounting system of claim 15 wherein the socket comprises brass raised features in contact with the ball.

20. The component mounting system of claim 15 wherein the socket comprises tetrafluoroethylene raised features in contact with the ball.

21. The component mounting system of claim 15 wherein the socket, collar, and ball are formed of stainless steel.

22. The component mounting system of claim 15 wherein the component to be mounted is selected from the group consisting of collimators, lasers, lenses, and spatial light modulators.

23. A method for aligning an optical component, the method comprising:
   a) affixing the optical component to a ball;
   b) placing the ball into a socket;
   c) fastening a collar having an opening to the socket, capturing the ball within the collar/socket assembly, the collar having at least three springs that are mechanically biased symmetrically around and against the ball;
   d) pivoting the ball into position; and
   e) affixing the springs to the ball, thereby fixing the pivotal alignment of the ball relative to the collar/socket assembly.

24. The method of claim 23 wherein a beam of light exits from the optical component in a direction fixed by the pivotal alignment of the optical component and further comprising:
   a) placing an optical sensor at a spot terminating a path from the optical component;
   b) measuring the intensity of the optical signal received at the optical sensor;
   c) continuing the pivoting of the ball-and-component assembly until the intensity of the received optical signal is generally at a maximum.

25. The method of claim 24 wherein the affixing of the springs to the ball is accomplished by welding.

26. The method of claim 25 wherein the welding is laser welding.

* * * * *